J. P. MULLER.
IGNITING DEVICE.
APPLICATION FILED JAN. 18, 1919.

1,314,419.

Patented Aug. 26, 1919.

WITNESSES:
Edwin G. McKee
T. E. Turton

INVENTOR
Jean P. Muller
BY
Victor J. Evans
ATTORNEY

J. P. MULLER.
IGNITING DEVICE.
APPLICATION FILED JAN. 18, 1919.

1,314,419.

Patented Aug. 26, 1919.
2 SHEETS—SHEET 2.

WITNESSES:
Edwin G. McKee
T. E. Turpin

INVENTOR
Jean P. Muller
BY
Victor J. Evans
ATTORNEY

UNITED STATES PATENT OFFICE.

JEAN PIERRE MULLER, OF LE HAVRE, FRANCE.

IGNITING DEVICE.

1,314,419. Specification of Letters Patent. Patented Aug. 26, 1919.

Application filed January 18, 1919. Serial No. 271,911.

*To all whom it may concern:*

Be it known that I, JEAN P. MULLER, a citizen of Luxemburg, residing at Le Havre, France, have invented new and useful Improvements in Igniting Devices, of which the following is a specification.

My present invention pertains to igniting devices, and consists in the peculiar construction, novel combinations and adaptation of parts as hereinafter described and claimed.

In the accompanying drawings hereby made a part hereof:

Similar numerals of reference designate corresponding parts in all of the views of the drawings.

Figure 1:
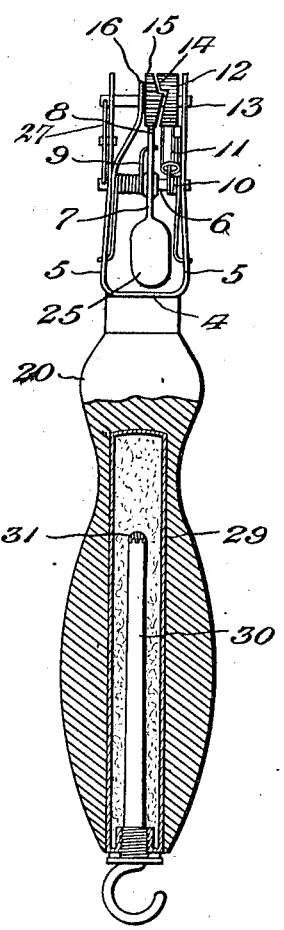
Figures 1 and 2 are views showing different forms of my invention.
Figure 2:
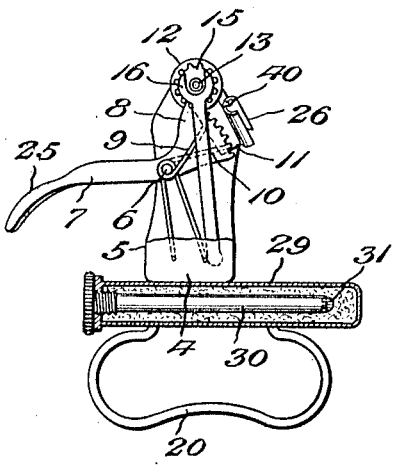

By comparison of Figs. 1 to 5, it will be noted that each of the three embodiments comprises a metallic loop-shaped body 4 having side arms 5 in which is arranged a transverse shaft 6 that serves as a fulcrum for a lever 7 equipped with a sector gear 8. The shaft 6 is preferably of tubular form and is equipped with a spring 9 connected to one arm 5 and also to the sector gear 8. At 10 is a second spring mounted on the shaft 6 and connected to one arm 5 and having its opposite end portion or arm disposed in a split or longitudinally slotted tube 11 and adapted to serve as a follower in pushing or feeding a metallic cerium rod against the roughened periphery of a disk 12, the function of which is by coöperation with the said rod to strike fire. The disk 12 is mounted on a transverse shaft 13 and is provided with an inner clutch face 14. Opposed to the said clutch face 14 of the disk 12 is the complementary clutch face of a disk 15; said disk 15 being yieldingly pressed against the disk 12 by a spring. The spring last referred to is indicated in Figs. 1 and 2 as 16, and will be understood as being of flat character, attached to the adjacent arm 5 or stamped from the arm and having its free end portion of bifurcated form so as to bear against the disk 15 of the opposite sides of the shaft 13. It will be seen that in the embodiment disclosed by Figs. 3, 4 and 5, the described yielding pressure of the disk 15 is accomplished by a coiled spring 9, for example.

The disk 15 is provided with peripheral teeth which are intermeshed with the complementary teeth of the sector gear 8, whereby oscillation of the lever 7 will be attended by rotation of the disk 15. Incidental to the rotation of the disk 15 in one direction, the said disk will manifestly carry with it the disk 12, while its movement in the opposite direction to disk 15 will leave the disk 12 at rest. In the embodiment shown in Figs. 1 and 2, the free end portion of the lever 7 is preferably flattened, as indicated by 25, for the application of the thumb of the user.

Each of the three embodiments shown in Figs. 1, 2 and 3—5, includes a handle 20.

It will also be observed by reference to Fig. 2 that the embodiment therein comprises a support 26 in the form of a gutter. The said support being adapted to hold the wick tube of a gasolene lamp in such position that the wick is disposed in front of the spark exit, with a view to assuring instantaneous ignition of the wick when the steel disk 12 is suddenly moved against the metallic cerium rod. When this is done, the device may be used for illumination or for lighting purposes. I would also invite attention to the fact that the support or holder 26 is provided at its upper end with a pointed portion 40 against which the edge of the wick bears, so that the wick will be positioned exactly in front of the spark exit of the device, hereinbefore referred to.

I would also have it here understood that the support 26 may also be used to hold a torch or continuing match such as shown in Figs. 1 and 2; the said torch or match comprising a tube 30 containing an asbestos wick, and being disposed when not in use in a metallic tube 29, Figs. 1 and 2. Said tube 29 is lined with felt as shown to absorb gasolene when the tube is charged with such substance. The construction shown in Fig. 1 or the construction shown in Fig. 2 may be resorted to with a view to closing the tube 29 hermetically; the said construction manifestly permitting of ready removal of the tube 30 when desired.

Where the wick projects beyond the forward end of the tube 30, a dented metallic fabric portion 31 is provided which has for its function to prevent crumbling of the asbestos wick and to assure ignition of the wick notwithstanding a small portion of the same is exposed.

Figure 3:
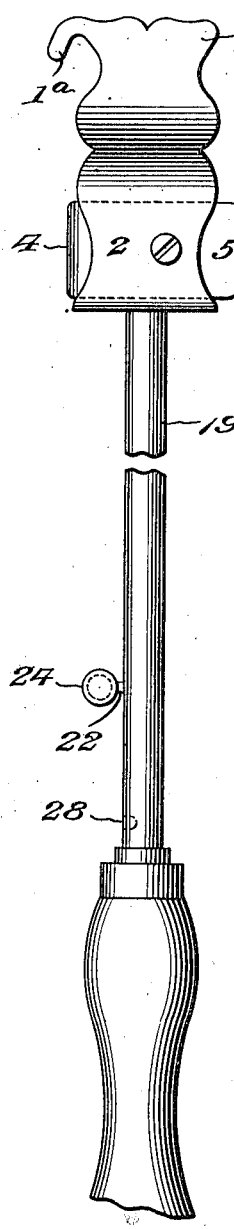
Figs. 3, 4 and 5 are views showing a third form of the invention.

In the embodiment shown in Figs. 1, 3, 4 and 5, one of the arms 5 of the body 4 is equipped with a thin metallic plate 27 riveted at its center to the arm and adapted to be moved about said center. The said plate 27 has its ends beveled, as shown in Fig. 3, and adapted to enter notches in the extended portions of the shafts 6 and 13. Adjacent to the opposite arm 5, the said shafts 6 and 13 have split heads which enable the same to be turned about their axes. In the position shown in Fig. 3, the plate 27 serves to prevent rotation of the shafts 6 and 13 and endwise removal of said shafts. When, however, the plate 27 is disengaged from the shafts 6 and 13, the shafts may be withdrawn endwise and the mechanism of the ignition device may be readily disassembled for the removal of a worn part or for any other purpose. It will also be observed that in the embodiment of Figs. 1 and 3 to 5, the lever 7 is apertured at 17, and the body 4 is fixed in a bifurcated head 2 having its terminal portions forming a fork 1 adapted to be used to advantage in the turning of lamp cock. The said terminal portions 1 are preferably hooked, as indicated by 1ª, Figs. 3 and 5, for use in opening and closing gas tips which are operated through the medium of a lever and a chain or chains.

Figure 4:
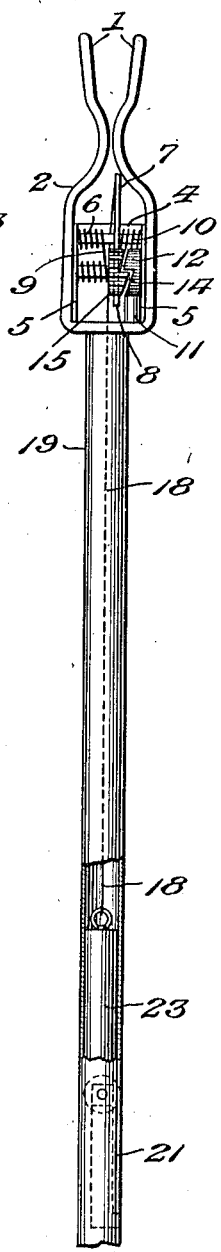
Figure 5:
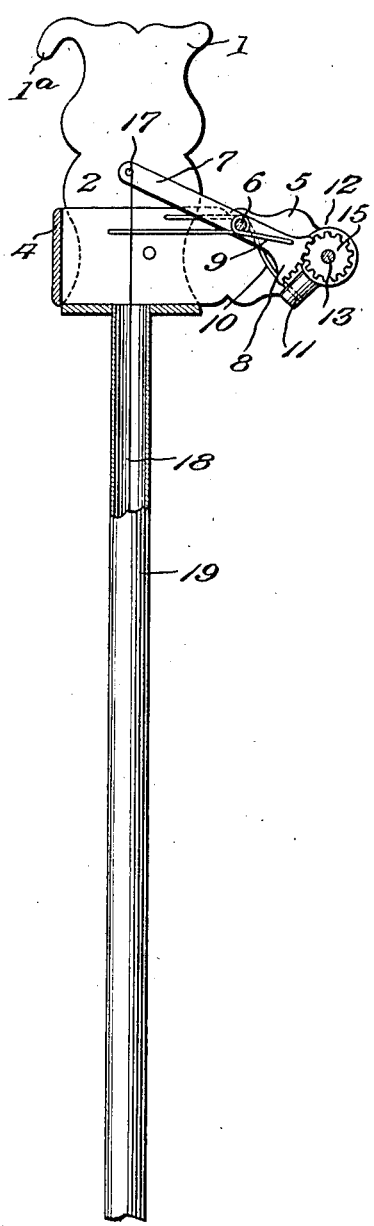

The head 2 is fixed on a tube 19. A wire 18 is connected at 17 to the lever 7 and passes through the tube 19. Adjacent to the lower end of the tube 19 is a slot or elongated opening 21 for the play of a rod 22, fixed to a sliding member 23 to which the lower end of the wire 18 is attached. As shown in Figs. 3 and 4, the rod 22 has an exterior finger-piece 24. At its lower end the slot 21 is provided with a notch 28 designed to receive and hold the rod 22 when it is desired to prevent movement of the lever 7. Thus the device is protected before its engagement with the top of the lamp chimney, and it is again made automatic in operation by releasing the rod 22. In this way is eliminated all shock which might break incandescent mantles in the event of a long igniting device being employed and the device being actuated by the thumb of the hand.

Figure 6:
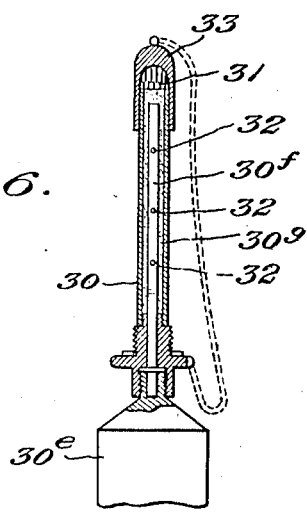
Fig. 6 is a detail view showing a torch element adapted more especially for use in the igniting device as a part thereof.

In Fig. 6 I illustrate a torch or match 30 screwed on a tube 30ᵉ, designed to contain semi-solid gasolene. In this form a small tube 30ᶠ is carried in the center of the wick 30ᵍ, and is provided with apertures 32 for the passage of the gasolene to the asbestos wick when the container 30ᵉ is compressed. When the tube 30 is disposed in the support 26, Fig. 2, the device as a whole may be used after the manner of a lamp. The wick in the tube 30 is protected at 31 in the same manner as in Fig. 1. I would also have it understood that when the torch or match 30 is not in use, evaporation of gasolene is prevented by a cap 33 attached to a small chain as shown, which chain when desired may be used as a hanger.

Having described my invention, what I claim and desire to secure by Letters-Patent, is:

1. In an igniting device, a torch having a wick, handle-forming means for holding inflammable substance and in which the torch is removably disposed when not in use, a resilient holder for clamping the torch when the same is in use, and means for supplying a spark to the wick of the torch to ignite the wick; the latter means being disposed in close proximity to the wick.

2. In an igniting device, the combination of a body having spaced arms, transverse shafts disposed in transverse apertures in said arms and each having a head and also having a notch adjacent to its opposite end and exterior of the adjacent arm, and a plate pivoted to the said arm between the extended portions of the shafts and having beveled ends adapted to enter the notches of the shafts.

3. As a new article of manufacture, a compressible container, a central tube in communication therewith and open at its ends and having apertures at intervals in its length, a tubular coupling secured on the end of the container and surrounding the base of said tube, a wick surrounding the said tube, a second tube connected to the coupling and surrounding said wick, openwork metallic means at the outer end of the second tube for protecting the exposed portion of the wick, and a removable cap.

4. In an igniting device, the combination of a body having spaced arms, a handle connected with the body below and in line with said arms, shafts mounted in said arms, a strike disk loose on one of the shafts, between the arms, and having an inner clutch face, a spring-pressed gear also loose on said shaft and having an inner clutch face complementary to that of the strike disk, a lever fulcrumed on the other shaft and having a sector gear intermeshed with the first named gear, and a spring for moving the lever in one direction and yieldingly holding the same.

5. In an actuating device, the combination of a body having spaced arms, a tube connected with said body and adapted to contain gasolene, a handle also connected with the body, a torch or match removably arranged in said tube and equipped to hermetically close the same, a holder for torch or match when the same is put into use, transverse shafts carried by the arms of the body, a strike disk rotatable on one shaft and having a clutch face, a gear rotatable on said shaft and having a complementary clutch face, a lever having a sector gear intermeshed with the first-named gear, said lever being fulcrumed on the other shaft, a guide for a rod of metallic cerium, and follower means for feeding said rod through the guide 6. An igniting device comprising a lever, a spring for moving said lever in one direction, ignition means actuatable by the lever, means carrying the lever and the ignition means and including a tube on one end of which said lever, spring and ignition means are mounted; said tube having a longitudinal slot and an offset at the lower end thereof, a slide in the tube and connected with the lever, and means connected to the said slide and movable in said slot and into and out of the offset at the lower end thereof.

In testimony whereof I affix my signature.

JEAN PIERRE MULLER.